United States Patent [19]
Lang et al.

[11] Patent Number: 4,903,280
[45] Date of Patent: Feb. 20, 1990

[54] CIRCUIT ARRANGEMENT FOR SERIAL DATA TRANSMISSION BETWEEN A PLURALITY OF SUBSCRIBER STATIONS

[75] Inventors: Otto Lang; Manfred Dombrowski, both of Munich, Fed. Rep. of Germany

[73] Assignee: Siemens Aktiengesellschaft, Berlin and Munich, Fed. Rep. of Germany

[21] Appl. No.: 240,387

[22] Filed: Aug. 30, 1988

Related U.S. Application Data

[63] Continuation of Ser. No. 15,710, Feb. 17, 1987, abandoned.

[30] Foreign Application Priority Data

Feb. 17, 1986 [DE] Fed. Rep. of Germany ....... 3604982

[51] Int. Cl.$^4$ .............................................. H04B 1/44
[52] U.S. Cl. .......................................... 375/7; 375/36; 455/78; 340/825.5

[56] References Cited

U.S. PATENT DOCUMENTS

| | | | |
|---|---|---|---|
| 4,390,990 | 6/1983 | Ainsworth | 340/825.5 |
| 4,476,467 | 10/1984 | Terwilliger et al. | 340/825.5 |
| 4,627,076 | 12/1986 | Staal et al. | 375/36 |
| 4,638,311 | 1/1987 | Gerety | 340/825.5 |
| 4,652,873 | 3/1987 | Dolsen et al. | 340/825.5 |

FOREIGN PATENT DOCUMENTS

| | | | |
|---|---|---|---|
| 0049917 | 4/1982 | European Pat. Off. | 375/7 |
| 2363240 | 3/1978 | France | 375/7 |

OTHER PUBLICATIONS

"Data Transmission is Faster with Ternary Coding," Bruins, Electronics, vol. 47, No. 11, May 1974, pp. 119–120.
"RS422 and Beyond," Burgess, Electronic Engineering, vol. 53, No. 658, Oct. 1981, pp. 81–85.
"Line Drivers are not Limited to Computer Systems," Pippenger, Electrical Design News, vol. 17, No. 6, Mar. 1972, pp. 44–46.
"Bus—Faehige Schnittstelle nach RS 485/422," Abendroth, Elektronik, 12/15.6. 1984, pp. 97–98.
"Interface—Standard RS—485 Jetzt Praktisch Anwendbar," Elektronik, 6/23.3. 1984, p. 24.
Abendroth; Electronik; 12/15 Jun. 1984; pp. 97 and 98 (no translation).

*Primary Examiner*—Robert L. Griffin
*Assistant Examiner*—Marianne Huseman
*Attorney, Agent, or Firm*—Hill, Van Santen, Steadman & Simpson

[57] ABSTRACT

A circuit arrangement for serial data transmission between a plurality of subscriber stations via a data bus with transmitters that are high-impedance in the passive condition and low-impedance in the active condition is provided with a mutual control of the subscriber stations which occurs via the data bus without the assistance of additional control lines. This is achieved in that the leads of the data bus are each connected to a voltage source at at least one location via a resistor and in that at least one evaluation device for evaluating the voltages carried by the two leads is provided, the evaluation device outputting a busy signal given voltages of different magnitude at the leads of the data bus and outputting a free signal given identical voltages at the leads of the data bus. The circuit arrangement is particularly suitable for utilization in remote control devices.

10 Claims, 3 Drawing Sheets

CIRCUIT ARRANGEMENT FOR SERIAL DATA TRANSMISSION BETWEEN A PLURALITY OF SUBSCRIBER STATIONS

This is a continuation of application Ser. No. 015,710, filed Feb. 17, 1987, now abandoned.

CROSS REFERENCE TO RELATED APPLICATIONS

This application relates to application Ser. No. 014,536 filed Feb. 13, 1987 and application Ser. No. 015,713 filed Feb. 7, 1987.

BACKGROUND OF THE INVENTION

1. Field of the Invention

The present invention is directed to a circuit arrangement for serial data transmission between a plurality of subscriber stations, comprising at least two data transmitters having their output terminals connected to one and the same data bus which comprises two leads, and each having a control input connected to a control arrangement and being controllable by such control arrangement that, at most, one of the data transmitters is activated at a given time, whereby, in their activated condition, the data transmitters respectively output a voltage of a first polarity or of a second polarity to the data bus dependent on the state of a data signal applied to their input, whereby the data transmitters have a higher internal resistance at the output in the passive condition than in the active condition, and whereby at least one data receiver is connected to the data bus, the data receiver assuming, in the manner of a differential amplifier, one of two prescribed signal states at its output given an existing input voltage and dependent on its polarity.

2. Description of the Prior Art

An arrangement of the type set forth above is generally known from the periodical "Elektronik", 6/23 March 1984, page 24 and 12/15 June 1984, pp. 97 and 98.

The known circuit arrangement contains interface modules for serial transmission, each of which is composed of a data transmitter and a data receiver and is suitable for full-duplex or half-duplex operation. In half-duplex operation, the output of the data transmitter is directly connected to the input of the data receiver in every subscriber station. The subscriber stations which can be a computer and peripheral devices connected thereto, for example, are connected to a data bus. The data transmitter and the data receiver in each subscriber station can be driven into an active condition or into a passive condition by control signals.

Since the transmitters, in their active condition, represent a low-impedance voltage source at their outputs, whose voltage is dependent on the logic level of the data signal applied to the respective input, only one data transmitted can be activated at a given time.

To this end, a control signal that drives the data transmitter of a subscriber station into its active condition can be transmitted to all other subscribers and can be used at such other subscribers to make an activation impossible for the time in which the data bus is occupied. It is thereby obvious to transmit the control signal via control lines or via a control bus that is provided in addition to the data bus.

SUMMARY OF THE INVENTION

It is therefore the object of the present invention to provide a circuit arrangement of the type generally set forth above such that a mutual control of the subscriber stations occurs via the data bus without the assistance of additional control lines, this being accomplished such that the subscriber stations can access the bus on their own when the bus is not occupied by another subscriber station.

Given a circuit arrangement of the type generally set forth above, all data transmitters are high-impedance at their outputs given an unoccupied data bus. Proceeding from the perception within the scope of the invention that this high-impedance tristate condition is exploitable for control purposes, the circuit arrangement of achieving the above object is particularly characterized in that the data bus is provided with a resistor arrangement at at least one location, each lead of the data bus being connected to a voltage source via a resistor with the assistance of the resistor arrangement, and in that at least one of the control arrangements is preceded by a recognition circuit which, given at least approximately identical voltages at all of the leads of the data bus, outputs a free signal having a first logical state at its output and, given different voltages at the lines of the data bus, outputs a busy signal, having a second logic state, to the control arrangement. The data transmitters can thereby be connected to the subscriber stations in an unmediated or a mediated manner, particularly by way of transmission devices that are provided with modems.

The resistances of the resistor arrangement are to be dimensioned such that the arrangement defines the potentials of the data lines at at least one active data transmitter and the voltage source defines the potentials of the data lines in the case of exclusively passive data transmitters. When the data line is provided with terminating impedances of the size of the characteristic impedance of the data line in view of a high bit rate of the data signal to be transmitted, then the resistances of the resistor arrangement are to be dimensioned adequately low-impedance in comparison to the terminating impedances but as high-impedance as possible within this framework. When no terminating impedances are present, the resistances of the resistor arrangement are to be dimensioned adequately low-impedance in comparison to the parallel connection of the leakage resistances of the modules connected to the data bus.

An advantage which arises on the basis of the aforementioned measures is that the subscriber stations can acquire information concerning the occupancy of the data bus with devices that are simple to realize without a separate control bus being required for that purpose. With particular advantage, the busy signal can be used for the control of one or more modems such that the transmitter of the modem or, respectively, the transmitters of the modems are driven into the active condition or the passive condition dependent on the occupancy of the data bus. When a modem seizes the data bus, then the data transmitters of all other modems are automatically deactivated without switch-over devices comprising involved control devices being required for that purpose.

In particular, a relay can serve as a recognition circuit, the winding of the relay being connected to the two leads of the data bus and the relay responding when the transmitter is active.

A circuit arrangement for serial data transmission, as set forth above, has the characteristic that, given an occupied data line, both leads have at least approximately the same potential, i.e. the voltage relative to a reference potential. In accordance with a further feature of the invention, this characteristic can be advantageously exploited in that the circuit arrangement is fashioned and is particularly characterized in that the recognition circuit contains evaluation devices for evaluating the voltages carried by the two leads relative to the reference potential, and in that, given the voltage level defined by the resistor arrangement, the evaluation devices form an output signal of a first type and form an output signal of a second type given the first prescribed voltage or given the second prescribed voltage, and in that the output signal of the evaluation devices are logically operated in the recognition circuit that the busy signal is formed given at. least one output signal of the second type.

A significant advantage of the foregoing structures is that the recognition circuit can be composed of electronic circuits of a standard type. In particular, Schmitt triggers having a following NAND gate can be employed.

When the data transmitters are of such a nature that they have a positive voltage in comparison to the reference potential or, respectively, ground at the one input terminal and have a negative potential in comparison thereto at the other output terminal, the resistor arrangement can be applied, for example, to the reference potential as an auxiliary voltage. When one of the two voltages that the output terminals of the data transmitters can assume is selected as an auxiliary voltage, then a greater spacing between the two voltages to be interpreted occurs, so that these voltages can be more easily distinguished from one another.

On the other hand, there are data transmitters that, in their activated condition, have a first prescribed voltage at one of the two output terminals and a second prescribed voltage, higher than the first voltage and of the same polarity relative to the reference potential, at the other of the two output terminals, so that differently-polarized output voltages likewise occur. Data transmitters of interface modules that are conceived for the interfaces RS 485, RS 422 or the like are, in particular, of this type. The interface RS 485 is known for half-duplex operation via a two-wire bus and the interface RF 422 is known for full-duplex or half-duplex operation via a four-wire data bus.

When such data transmitters and a voltage that is at least as high as the higher of the two voltages is used as an auxiliary voltage in a circuit arrangement of the type set forth above in which the recognition circuit that contains evaluation devices for evaluating the voltages on the two leads relative to the reference potential, then it follows that, given an occupied data bus, one of the two leads of the data bus always lies at the lower of the two prescribed voltages and, given an unoccupied data bus, both leads are charged with the higher of the two voltages. Advantageously occurring as a result thereof is that a single logic element can be provided as a recognition circuit, this logic element having its inputs connected to the leads of the data bus, upon interposition of level converters as warranted. In particular, the logic operation is such that the busy signal is formed given an output signal of the second type.

Advantageously, the circuit arrangement is constructed in such a manner as to be characterized in that the voltage of the voltage source to which the resistors of the resistor arrangement are connected is higher than the higher of the two prescribed voltages and in that the control signal receiver is formed by a logic element connected to the data bus, the logic element belonging to a circuit family wherein the lower of the two prescribed voltages corresponds to one logic state and the higher of the two voltages corresponds to the other logic state.

When the data transmitters belong to circuits for interfaces of the type RS 485, RS 422 or the like, logic elements in complementary-metal-oxide-semiconductor (CMOS) technology can be advantageously employed, in particular without having level converters, Schmitt triggers or the like preceding them. On the other hand, a recognition circuit comprising an OR gate composed of two diodes and having an inverter connected thereto via a transistor stage offers the possibility of adapting the response threshold of the recognition circuit to the specific conditions of the respective application on the basis of a suitable selection of the supply voltage provided for the transistor stage. In particular, a response threshold that differs only slightly from ground or, respectively, a reference potential can be realized in this manner.

With a circuit arrangement of the type set forth above which is particularly characterized in that a plurality of resistor arrangements are provided and in that the respective resistors in the resistor arrangements are connected to the voltage source via a diode which conducts the voltage of the voltage source, the advantage arises that an outage of the auxiliary voltage, where the voltage decreases, for example, to the value zero, does not deteriorate the function of the circuit arrangement for serial data transmission. In particular, a busy state can thereby not be simulated.

A subscriber station dare not access the data bus when it has already been occupied by another subscriber. When a subscriber station has seized the data bus, the recognition circuit recognizes the same. In this case, however, the data bus continues to be available to the subscriber station.

When the subscriber station itself does not contain a device that prevents a self-disconnection of the subscriber station in the operating state under consideration, then it is advantageous to forward a busy signal to the subscriber station only when the data bus is occupied by a different subscriber station.

Since the data transmitters in the subscriber stations are activated with the assistance of control signals, these control signals make criteria available regarding whether an identified occupation of the bus may possibly occur from the appertaining subscriber station itself. A common evaluation or logic operation of the control signal and of the busy signal therefore allows a determination regarding whether the data bus is occupied by the appertaining subscriber station or by some other subscriber station. For this purpose the circuit arrangement is particularly characterized in that a control input of the subscriber station preceding the assigned data transmitter is respectively preceded by an AND gate which has a first input connected to the recognition circuit and a second input, together with he appertaining data transmitter, is controllable by the subscriber station such that the AND gate is initialized only given a passively-driven data transmitter.

Dependent on the type of control circuit with or without following negation, the AND circuit inhibits the signal "data bus occupied" when the appertaining subscriber station itself seized the data bus.

An arrangement that advantageously eliminates disturbances or, respectively, needle pulses arising due to switching events is particularly characterized in that the output of the logic element is connected to a Schmitt trigger via an RC element so that the Schmitt trigger thereby simultaneously serves as the AND gate.

With the Schmitt trigger constructed as an AND gate, the advantage arises that the Schmitt trigger simultaneously eliminates disturbances and realizes the desired AND operation or, respectively, NAND operation.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
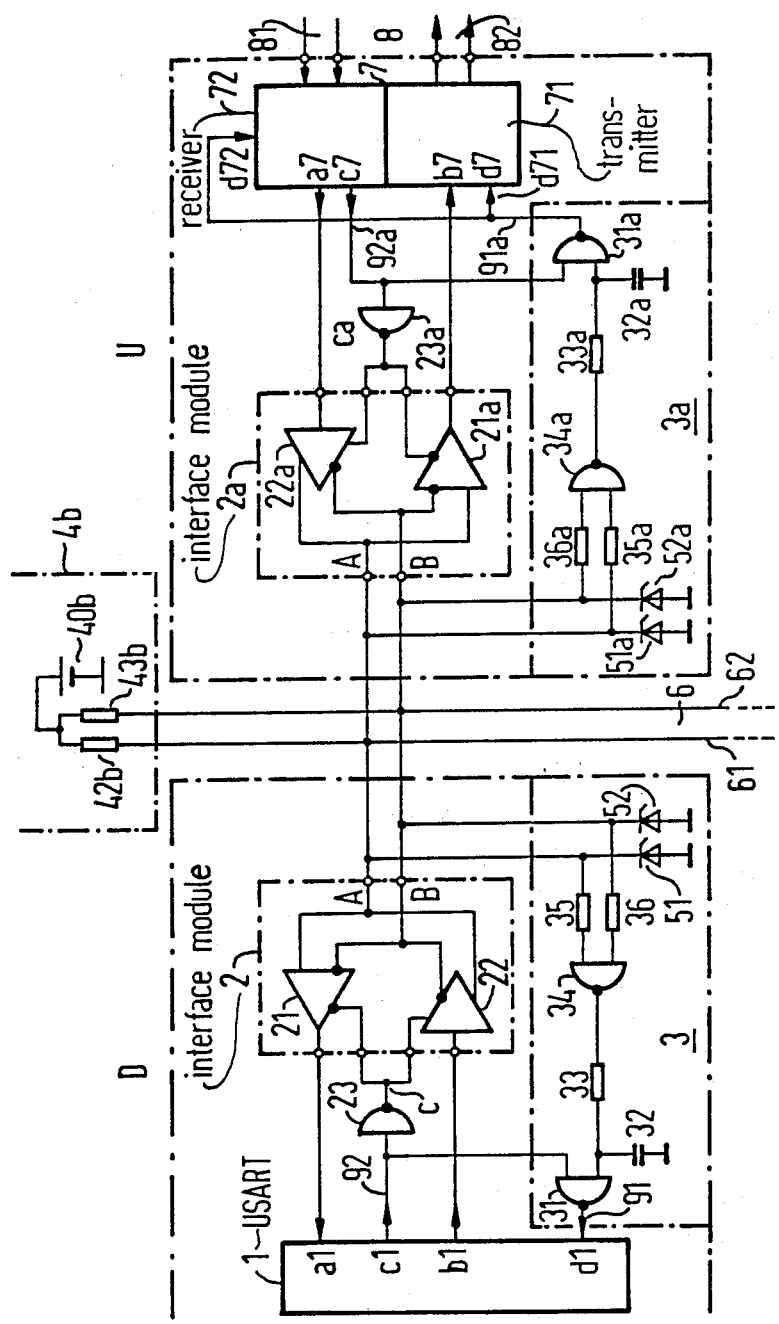
FIG. 1 is a schematic circuit diagram of a circuit arrangement for serial data transmission between a plurality of digital and transmission assemblies connected to one another via data bus and comprising a resistor arrangement connected to the data bus and having recognition circuits containing NAND gates.

FIG. 1 shows a circuit arrangement for serial data transmission. The two-lead bus 6 connects a plurality of assemblies of a remote control apparatus or of a remote control device, the digital assembly D and the transmission assembly U thereof being illustrated in FIG. 1. In addition to being used for data transmission, the two leads 61 and 62 of the data bus 6 are also used for the communication of control signals that serve for the mutual control of the assemblies.

The digital assembly D is a device for executive sequencing and, as a subscriber station 1 contains a USART 1 controlled by a microprocessor, an interface module 2 and a signal receiver 3.

The transmission assembly U comprises a modem 7 connected to a four-wire audio frequency transmission line 8 which comprises a transmitter 71 and a receiver 72, and further comprises an interface module 2a and a recognition circuit 3a. The modem 7 is composed, for example, of an fm transmitter and an fm receiver. The audio frequency transmission line 8 leads to at least one further subscriber station and is a component part of a remote control network comprising a plurality of stations or, respectively, further subscriber stations in the example set forth herein. The transmission line is a four-wire line composed of the incoming line 81 and the outgoing line 82. A two-wire line can be employed, when warranted, instead of the four-wire line. In this case, the transmitter 71 and the receiver 72 are to be connected to the two-wire line.

Further digital and/or transmission assemblies can be connected to the two leads 61 and 62 of the bus 6. In particular, such further digital assemblies can be devices for status signal input or output. Further transmission assemblies can serve the purpose of forwarding the serial data output onto the bus 6 by a digital assembly or by a transmission assembly to further transmission lines and stations connected thereto.

An interface suitable for such a multipoint bus configuration serves as the interface between the assemblies and the data bus 6, the data transmitters 22 or, respectively, 22a in such an interface and is high-impedance at the output in the unactivated condition. In particular, the interface RS485 is such an interface.

In a departure from FIG. 1, the data bus 6 can be terminated at both ends by a respective resistor between the two leads 61, 62 which has the characteristic impedance thereof.

All subscriber stations are connected at a common ground potential via a connection to ground that is not shown on the drawing.

For connection to the data bus 6, the assemblies (of which the drawing illustrates one digital assembly D and one transmission assembly U) are each provided with a respective interface module 2 or, respectively, 2a which, for example, can be of the type SN75176a.

In the interface module 2 of the digital assembly D, the output terminals A and B of the data transmitter 2 are directly connected to the input of the data receiver 21. The terminal A is connected to the lead 61 and the B is connected to the lead 62 of the data bus 6.

The data transmitter 22 and the data receiver 21 each have their control terminals connected to a common control line C and can be alternately driven active and passive by control signals, so that only the data transmitter 22 or the data receiver 21 can be respectively active at one and the same time.

The interface module 2a of the transmission assembly U is constructed like the interface module 2 of the digital assembly D. The output of the data transmitter 22a is directly connected to the input of the data receiver 21a. The data transmitter 22a and the data receiver 21a each have their control terminals connected to the a common control line Ca.

The interface module 2 of the digital assembly D is connected to the USART device 1. The interface module 2a of the transmission assembly U is connected to the modem 7.

The interface modules 2 and 2a represent level converters that are operated with TTL levels at that side facing away from the data bus 6. Depending on the logic state of the TTL logic level applied to the control line C, however, the data receiver 21 in the interface module 2 is activated and the data transmitter 22 is passive, or vice-versa. In a corresponding manner, the data receiver 21a at the interface 2a is activated and the data transmitter 22a is passive, or vice-versa, dependent on the logic level of the control signal applied to the control line Ca.

On the other hand, it can be advantageous in the digital assembly D to control only the data transmitter 22 via the control line C and to always leave the data receiver 21 switched on. Therewith, the data signal transmitted onto the bus 6 by the digital assembly D can be simultaneously evaluated for supervision.

In the digital assembly D, the output of the data receiver is conducted to the data input a1 of the USART device 1. The input of the data transmitter 22 is connected to the data output b1 of the USART device 1. The control input of the data receiver 21 and the control input of the data transmitter 22 are directly connected to one another and to the control line C. The control output c1 of the USART device is connected via the inverter 23 to the control line C of the interface module 2.

A resistor arrangement 4b is connected to the data bus 6. A series circuit comprising a pair of resistors 42b and 43b of the resistor arrangement 4b is connected between the two leads 61 and 62 of the bus 6. The junction of these resistors is connected to the positive pole of the auxiliary voltage source 40b which outputs an auxiliary voltage $U_H$. The negative pole of the auxiliary voltage source 40b is connected to ground.

The recognition circuit 3 of the digital assembly 1 D contains a NAND gate 34 whose inputs are connected to the leads 61 and 62 of the data bus 6 via a respective resistor 35 or 36. The output of the NAND gate 34 is connected to the signal input of a Schmitt trigger 31 via an RC element composed of a resistor 33 and a capacitor 32. A control input of the Schmitt trigger 31 is connected to the control output c1 of the USART device 1.

The two inputs of the Schmitt trigger 31 are linked to one another in a manner of an AND gate. The inverting output of the Schmitt trigger 31 is connected to the control input d1 of the USART device 1 via the control line 91.

The digital assembly D further comprises an arrangement for protection against overvoltages on the data bus 6. This arrangement is composed of the Zener diode 51 connected between the lead 61 and ground and of the Zener diode 52 connected between the lead 62 and ground.

The control signal receiver 3a of the transmission assembly U comprises a NAND gate 34a whose inputs are connected to the leads 61 and 62 of the data bus 6 by way of respective resistors 35a and 36a. The output of the NAND gate 34a is connected to the signal input of the Schmitt trigger 31a via an RC element composed of the resistor 33a and the capacitor 32a. A control input of the Schmitt trigger 31a is connected to the control output c7 of the modem 7.

The two inputs of the Schmitt trigger 31a are linked to one another in the manner of an AND gate. The inverting output of the Schmitt trigger 31a is connected to the control inputs d71 and d72 of the modem 7 via a control line 91a.

The transmission assembly U further comprises an arrangement for protection against overvoltages on the data bus 6, this arrangement being composed of a Zener diode 51a connected between the lead 61 and ground and a Zener diode 52a connected between the lead 62 and ground.

NAND gates whose inputs exhibit a Schmitt trigger characteristic advantageously serve as the Schmitt triggers 31 and 31a. In a modification of the illustrate circuit, such a NAND gate can be replaced by a Schmitt trigger connected to the RC element and having a following NAND gate that does not exhibit Schmitt trigger characteristics at its inputs.

When the remote control station illustrated in FIG. 1 transmits, the transmission data are applied at the output b1 of the USART device 1, are converted to the interface level in the data transmitter 22 of the interface module 2 serving as a driver, are fed by way of the lines 61 and 62 of the data bus 6 to the data receiver 21a of the interface module 2a, are input b7 of the transmitter 71 contained in the modem 7.

In the receiving condition of the remote control station, the received data are applied at the output a7 of the receiver 72 contained in the modem 7, are converted to the interface level in the data transmitter 22a of the interface module, are fed via the leads 61 and 62 of the data bus 6 to the data receiver 21 of the interface module 2, are converted to the TTL level by the latter and are output to the data input a1 of the USART device 1.

The tristate condition of the RS485 data bus 6 corresponding to a logical level "0" on the control line C or, respectively Ca, signals the connected assemblies that they can access the data bus. When an assembly accesses the data bus 6, then the data bus assumes a non-tristate condition. The evaluation of this condition leads to the formation of a control signal in the further assemblies which switches the control line 91 or, respectively, 91a to the logic level "0" and therefore inhibits the access of all other assemblies to the bus. This control signal also drives the transmission assembly (assemblies) such that their transmitters 71 become active toward the transmission lines 8 and such that their receivers 72 are inhibited.

The USART device 1 can be, for example, of the type SAB 8251 A.

The control of the interface module via the bus 6 comprises the following operating conditions:

(a) When the data bus 6 is not occupied, i.e. when all data transmitters 22, 22a are in the high-impedance tristate condition, then the two leads 61 and 62 of the data bus lie at positive potential of, in particular, about $U_H=12V$, lying thereat via the resistors 42b, 43b. Voltage to which the logical level "1" corresponds, therefore, respectively derive at the two inputs of the CMOS NAND gates 34 or, respectively, 34a. The outputs of the NAND gates 34 and 34a therefore have the logic level "0". The output of the Schmitt trigger 31 or, respectively, 31a is therefore switched to the logic level "1", regardless of the logic level of the control signal fed to its control input.

In the digital assembly D and, under given conditions, in further digital assemblies, the logic level "1" on the control line 91 signals the USART device 1 that the data bus is not occupied. In this case, the audio frequency transmission line 8 of the remote control network is also not occupied. In the transmission assembly and, under given conditions, in further transmission assemblies, the logical "1" on the control line 91a drives the receiver 72 to receive and inhibits the transmitter 71.

(b) When the data bus 6 is seized by the digital assembly, then, in the seizing of the digital assembly, control outputs c1 of the USART device 1 switches the control line 92 connected thereto to the logic level "0". The inverter 23 activates the data transmitter 22. The output of the data transmitter 22 is therefore in a low-impedance condition. Dependent on the logic state at the data output b1 of the USART device 1, a logical "1" or a logical "0" is transmitted via the data bus 6.

The two prescribed voltages at the output terminals A, B of the data transmitters 22, 22a can assume relative to the reference potential have the same polarity.

In the case of the interface RS 485, the voltage 3.7V for example, is at the output terminal A of the interface module 2 given a logic level "1" and the voltage 1.1V to ground, for example, lies at the output terminal B.

Given a logic level "0", the voltage 1.1V, for example, lies at the output terminal A and the voltage 3.7V, for example, lies at the output terminal B. Given an activated interface module and a bus 6 thereby occupied, one of the two leads 61 or 62 therefore basically lies at the low voltage of, for example, 1.1V. The logic level "0" at the input of the CMOS NAND gate 34 corresponds to this potential. This condition switches the output of the NAND gates 34 and 34a to the logic level "1" in all assemblies.

In the active digital assembly D, this signal is not forwarded since the Schmitt trigger 31 is inhibited by a logical "0" from the control output c1 of the USART device 1.

In the operating condition under consideration, further digital assemblies (not shown on the drawing) which may be present are not active, by contrast, so that the Schmitt triggers are opened by a logical "1". The logical "1" at the output of the NAND gate therefore drives the control line to the logic level "0" via the following Schmitt trigger, informs the USART device that the data bus 6 is occupied by another assembly and therefore inhibits access to the data bus 6.

In the transmission assembly U and, under given conditions, in further transmission assemblies, the logical "1" at the output of the NAND gate 34a drive the control line 91a to a logic level "0" via the following Schmitt trigger 31a therefore inhibits the receiver 72 and switches on the transmitter 71.

(c) When the data bus 6 is occupied by the transmission assembly U, then the receiver 72 receives a message from the remote control network via the audio frequency line 8. The control line 92a switches to a logical "0", therefore inhibits the Schmitt trigger 31a and activates the data transmitter 22a via the inverter 23a so that the data transmitter 22a works onto the data bus 6. The analogous case applies to a further transmission assembly in case this occupies the data bus 6 instead of the transmission assembly U.

In the digital assembly D connected to the data bus 6, the NAND gate 34 recognizes the busy condition and, with a logical "0" that proceeds to the control input d1 of the USART device 1 via the control line 91, inhibits the access of the USART device 1 to the bus 6. The same likewise applies to further digital assemblies connected to the bus 6.

When further transmission assemblies U are connected to the bus 6, then their NAND gates 34a recognize the busy condition and, via the following Schmitt trigger 31a switch off the receiver 72 and switch on the data transmitter 71.

Branching functions in transmission networks can be realized in an especially simple manner with the assistance of the control arrangement without having a requirement for additional logic operations or control signals or control signal lines between the transmission assemblies.

In a modification of the illustrated arrangement, it can also be advantageous not to drive the receiver active or passive dependent on the occupancy of the data bus, but to always keep it ready to receive in that its control input is permanently applied to ground potential.

Figure 2:
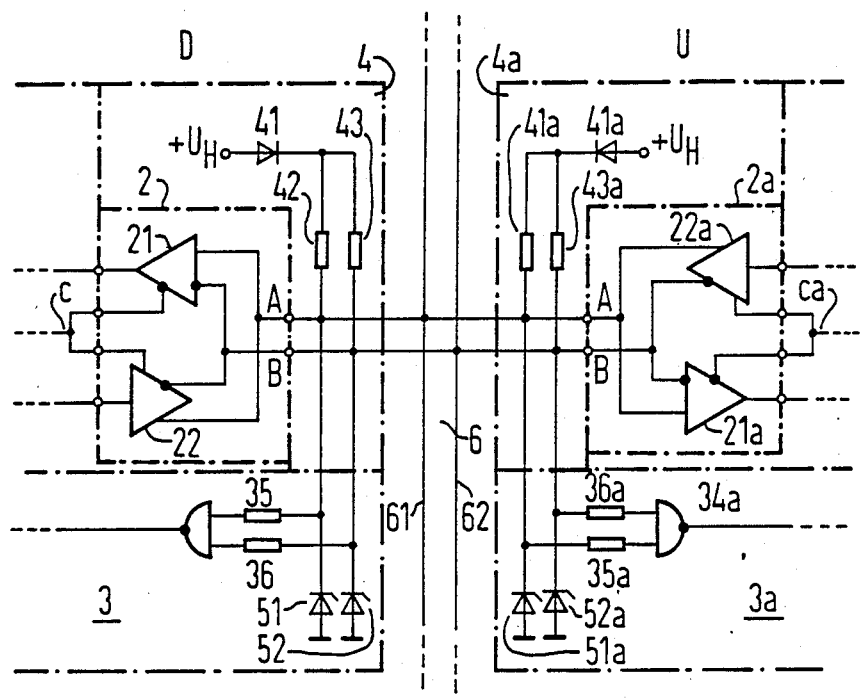
FIG. 2 is a schematic circuit diagram of a circuit arrangement for serial data transmission wherein each assembly contains its own resistor arrangement, shown as an excerpt.

Referring to FIG. 2, a circuit arrangement for serial data transmission is illustrated which largely agrees with that of FIG. 1. In a departure therefore, a plurality of decentralized resistor arrangements 4 and 4a are provided instead of a single resistor arrangement 4b.

Each of the assemblies connected to the data thus 6 has its resistor arrangement assigned thereto, this being preferably accommodated by the appertaining assembly. The resistor arrangements 4 and 4a are respectively constructed like the resistor arrangement 4b of FIG. 1.

In the digital assembly D, a series connection comprising the resistors 42 and 43 of the resistor arrangement 4 applies between the two leads 61 and 62 of the data bus 6. The junction of the resistors 42 and 43 is connected to the cathode of a diode 41 whose anode is connected to the positive pole of the auxiliary voltage source 40 that outputs the auxiliary voltage $U_H$. The negative pole of the auxiliary voltage source 40 is connected to ground.

In the transmission assembly U, a series connection comprising a pair of resistors 42 and 42b of the resistor arrangement lies between the two leads 61 and 62 of the data bus 6. The junction of the resistors 42a and 43a is connected to the cathode of the diode 41a whose anode is connected to the positive pole of the auxiliary voltage source 40a that outputs the auxiliary voltage $U_H$. The negative pole of the auxiliary voltage source 40a is connected to ground.

The exemplary embodiment illustrated in FIG. 2 has the advantage that no separate assembly is required for the resistor arrangement.

Figure 3:
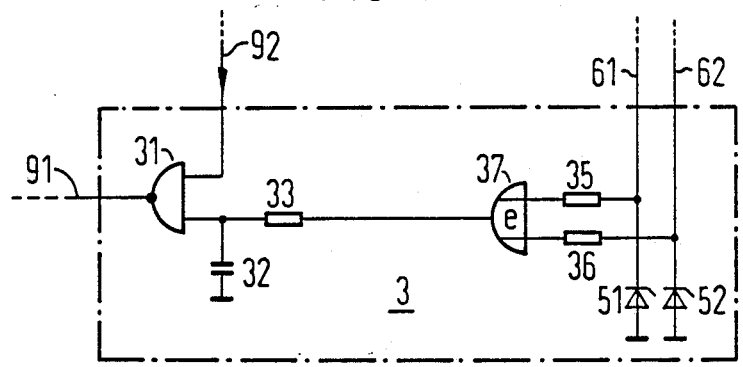
FIG. 3 is a schematic circuit diagram of a recognition circuit comprising an EXCLUSIVE OR gate.

FIG. 3 illustrates a recognition circuit which largely coincides with the recognition circuit in the arrangement of FIG. 2. The only departure is that an EXCLUSIVE OR gate 37 is provided instead of the NAND gate 34. This recognition circuit can replace the recognition circuit 3 or, respectively, 3a in the circuit arrangements of FIG. 1 and FIG. 2. The EXCLUSIVE OR element 37 has the advantage that a positive or a negative auxiliary voltage can be utilized in the resistor arrangements 4 and 4a. As in the other exemplary embodiments, the auxiliary voltage must be of at least approximately the same magnitude in all resistor arrangements that are connected to the data bus 6.

Figure 4:
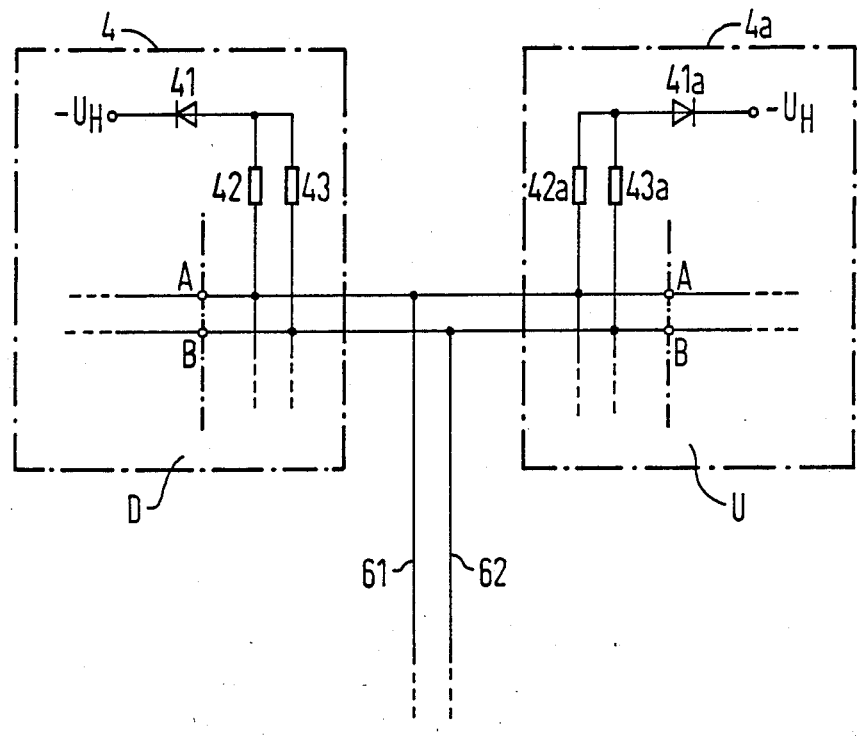
FIG. 4 is a schematic circuit diagram of a circuit arrangement for serial data transmission in which each assembly contains a resistor arrangement connected to a negative auxiliary voltage.

The portion of the circuit arrangement for serial data transmission shown in FIG. 4 shows that case wherein a negative auxiliary voltage $-U_H$ is employed in all resistor arrangements 4 and 4a instead of a positive auxiliary voltage. The diodes 41 and 41a are therefore respectively polarized such that their cathodes lie at the auxiliary voltage $-U_H$.

Figure 5:
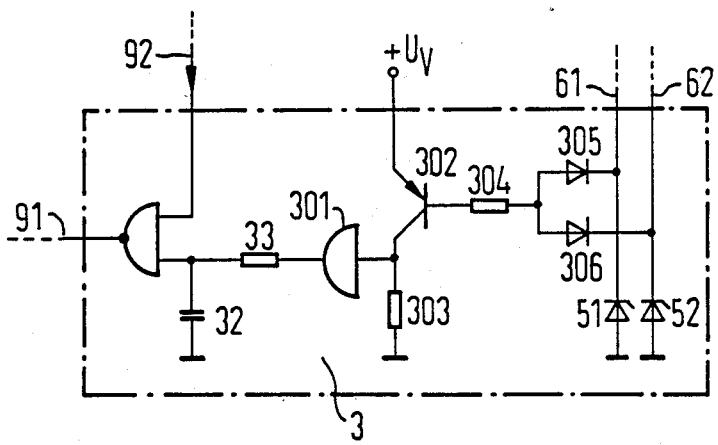
FIG. 5 is a schematic circuit diagram of a recognition circuit which comprises two diodes and a transistor.

The recognition circuit illustrated in FIG. 5 contains two diodes and a pnp transistor. The diodes 305 and 306 each have their cathode connected to a lead 61 or, respectively, 62 of the data bus. ;The anodes of the diodes 305 and 306 are directly connected to one another and are connected to the base of the transistor 302 via a resistor 304. The transistor 302 has its emitter connected to the supply voltage $+U_V$ and has its collector connected to ground via a resistor 303 and directly connected to the input of the NAND gate 31 via the RC element composed of the series resistor 33 and the shunt capacitor 32. The NAND gate 31 has its other input connected to the control line 92. The control line 91 is connected to the output of the NAND gate 31.

The supply voltage $U_V$ amounts to, for example, 5V. Two diode thresholds and a resistor are respectively effective between the leads 61 and 62 of the data bus 6 and ground, in particular the respective diode threshold of the appertaining diodes 305 and 306 and the diode threshold of the base-emitter path of the transistor 302. Given an occupied data bus, one of the leads 61 or 62 has approximately ground potential thereon. The appertaining diode 305 or 306 becomes conductive and through-connects the transistor 302 which, therefore, assumes a potential at its collector that corresponds to a logical "1". The output of the driver 301 outputs the same logic level.

When one or more diodes, polarized such that they are isodirectionally connected in series with the base-emitter diode, are inserted between the emitter of the transistor 302 and the supply voltage $+U_V$, then the response value of the recognition circuit can be selected in a comparatively broad range.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. In a circuit arrangement for serial data transmission between first and second subscriber stations connected to respective first and second transmission/receiving devices and each of the subscriber station including a data transmitter and a data receiver, each data transmitter and each data receiver connected to two leads of a data bus, each of said transmitters including a control input responsive to control signals from the other transmitter such that only one of the transmitters is active at a time to output a voltage of a first polarity or of a second polarity dependent on the state of a data signal applied thereto by the respective transmission/receiving device, each of the transmitters having a higher internal impedance in the passive condition than in the active condition, and each of the receivers operable in response to the polarity of the voltage received from the other station to output data to the respective transmission/receiving device, the improvement therein comprising:
   a resistor arrangement connected to the data bus and connecting both leads thereof via resistors to the same potential; and
   a recognition circuit in at least one of the subscriber stations connected to the two leads of the data bus and responsive to at least approximately identical voltages on the leads of the data bus to output a free control signal having a first logic state and responsive to different voltages of the leads of the data bus to output a busy control signal having a second logic state.

2. The improved circuit arrangement of claim 1, wherein:
   said recognition circuit comprises two evaluation devices, each connected to the two leads of the data bus and each operable, by comparing the voltages of the two leads to a reference potential, to form an output signal of a first type in response to identical voltages on the leads of the data bus and of a second type in response to different voltages on the leads of the data bus; and
   means for logically combining the signals of the first and second type connected to said evaluation devices so that said recognition circuit provides a busy control signal given at least one output signal of the second type.

3. The improved circuit arrangement of claim 2, and further comprising:
   said voltage source connected to said resistor arrangement providing a voltage which is higher than the two voltages of said first and second output signals, and
   wherein said means for logically combining comprises a control receiver including a logic element connected to said two leads of said data bus and to said evaluation devices, said logic element comprising a circuit in which the lower of the two prescribed voltages corresponds to one logic state and the higher of the two voltages corresponds to the other logic state.

4. The improved circuit arrangement of claim 3, wherein:
   said resistor arrangement comprises a plurality of resistors, each plurality being provided at the respective subscriber station; and
   a plurality of diodes in each subscriber station, each of said diodes connecting a respective resistor to said voltage source.

5. The improved circuit arrangement of claim 4, wherein:
   each of said transmitters and receivers includes a control input; and
   an AND gate including a first input connected to said recognition circuit and a second input, together with said control input of said data transmitter, connected to the respective transmitting/receiving device of said subscriber station and controlled thereby such that said AND gate is enabled only given a passive respective data transmitter.

6. The improved circuit arrangement of claim 5, wherein:
   said logic element comprises an output;
   a resistor-capacitor combination is connected to said output of said logic element; and
   a Schmitt trigger is connected to said output of said logic element via said resistor-capacitor combination.

7. The improved circuit arrangement of claim 6, wherein:
   said Schmitt trigger is constructed as an AND circuit.

8. The improved circuit arrangement of claim 7, wherein:
   said logic element comprises a NAND gate.

9. The improved circuit arrangement of claim 7, wherein:
   said logic element comprises an EXCLUSIVE OR gate.

10. The improved circuit arrangement of claim 7, wherein:
    said logic element comprises a transistor including a collector-emitter path connected between a further voltage source and a reference potential and a base; and
    a pair of diodes serving as said evaluation devices and connecting the leads of the data bus to said base.

* * * * *